Aug. 28, 1928.
I. W. MILLER
CUSHION TIRE
Filed Feb. 18, 1928
1,682,302
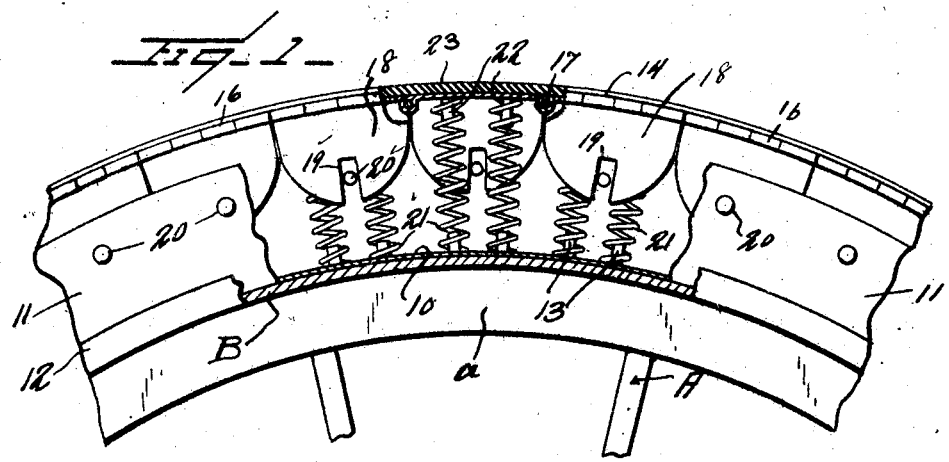
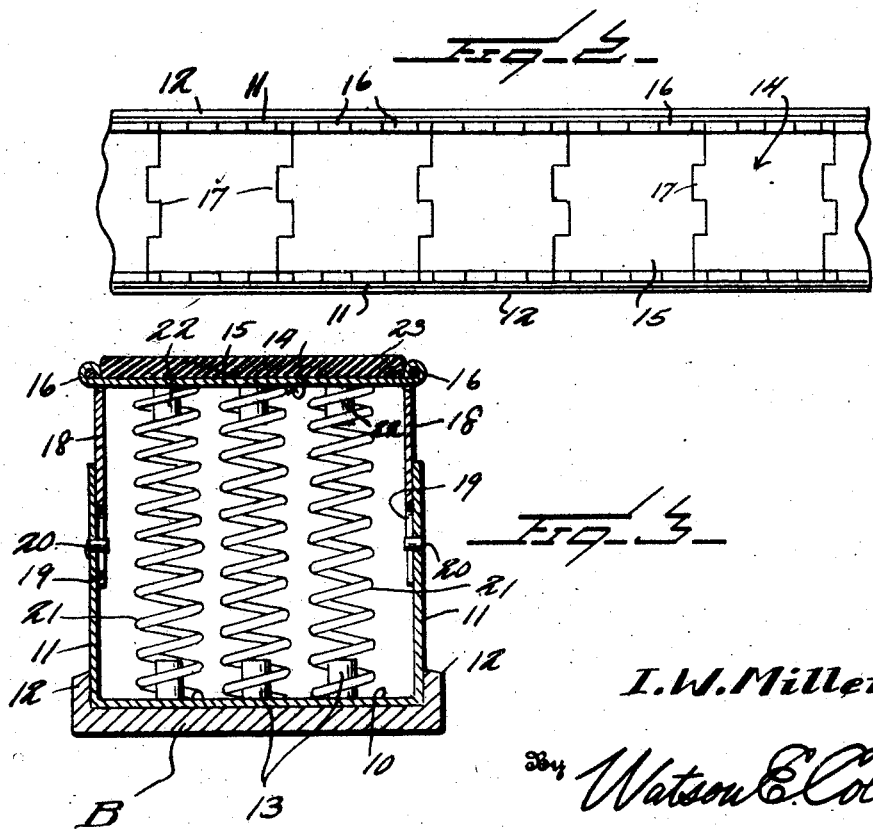
Inventor
I. W. Miller
By Watson E. Coleman
Attorney Patented Aug. 28, 1928.

1,682,302

UNITED STATES PATENT OFFICE.

IRWIN W. MILLER, OF ALLENTOWN, PENNSYLVANIA.

CUSHION TIRE.

Application filed February 18, 1928. Serial No. 255,471.

This invention relates to automobile wheels, and particularly to spring cushion tires.

The general object of the invention, of course, is to provide a cushion tire for automobile wheels which will take up shocks and jars in the same manner that a pneumatic tire does but in which the outer or tread portion of the tire will be urged outward by means of springs.

A more specific object is to provide a tire of this character which shall be flexible and yielding in every direction in the same manner that a pneumatic tire is and in which the tire proper or tread portion of the tire shall be formed of interconnected, hinged links of metal or like material.

My invention is illustrated in the accompanying drawing, wherein:—

Figure 1 is a fragmentary elevation partly in section of a tire constructed in accordance with my invention;

Figure 2 is a plan view of a portion of the tire, the rubber outer covering being removed;

Figure 3 is a cross sectional view of the tire on an enlarged scale;

Referring to this drawing, A designates a wheel having a felly $a$, at present shown as provided with a demountable rim B which has the usual lateral flanges. Disposed upon the rim is a tire constructed in accordance with my invention comprising a base 10 having outwardly projecting, lateral flanges 11. This base portion with its flanges fits within the lateral flanges 12 of the demountable rim B and carries outwardly projecting pins 13. The outer portion of the tread of the tire is generally designated at 14. This tread may be of any suitable material but is preferably formed of a series of metallic sections, as shown in Figure 2, each section being designated 15. Each section is formed at its lateral margins with hinge beads 16 projecting outward from the section and the forward and rear edges of each section are formed with inwardly projecting hinge bead 17. The hinge beads 17 of adjacent edges of the sections are pivotally connected so that all the sections of the tire are hingedly connected to one another to provide a peripheral band.

Connected to the bead 16 of each section 15 are side flanges 18, these side flanges having a rounded taper at their side edges and being each provided with a notch 19. The side flanges 11 are provided with inwardly projecting pins 20 which seat in the notches 19. Disposed within the tire are a plurality of rows of coiled compression springs 21 which rest upon the pins 13 and at their outer ends engage about pins 22 projecting inwardly from the sections of the tread portion 14. These springs act to urge the tread portion of the tire outwardly but permit the inward movement thereof.

As disclosed in Figures 1 and 3, the tread of the tire is provided with a rubber covering 23 which is held in position between the outwardly projecting beads 16 at the side edges of the sections. Any other material may be employed in the construction of the covering 23 if so desired. This covering being flexible, will not in any way interfere with the flexing of the sections 14.

It will be seen that with a tire of this character the tread may be yieldably urged inwardly and is entirely flexible so that stones or other protuberances in the road will cause a substantially local depression of a particular portion of the tire without causing a depression of the entire road-engaging surface. In this manner the tire is prevented from being bodily lifted while passing over minor obstructions and a large percentage of the shocks ordinarily transmitted to the vehicle are absorbed therein.

I claim:—

1. A cushion tire of the character described comprising an annular base having side flanges, an annular rim formed of a plurality of interconnected hinged sections, each section having side members extending inward within the side flanges of the base portion and rockingly connected thereto, and compression springs disposed between the base and tread portion and urging the tread portion outward.

2. A tire of the character described comprising an annular base portion having side flanges, the side flanges having inwardly directed pins, an annular tread portion formed of a plurality of interdigitated hinged sections, each of said sections having inwardly extending flanges formed with notches adapted to engage said pins whereby the sections may rock upon said pins, and a plurality of rows of coiled compression springs disposed between the base and said tread portion and urging the tread portion outward and held from bodily movement circumferentially of the tire.

3. A cushion tire of the character described comprising an annular base having side flanges, an annular rim formed of a plurality of interconnected hinged sections, each section having side members hinged thereto and extending inward within the side flanges of the base portion and rockingly connected thereto, springs disposed between the base and tread portion and urging the tread portion outward.

In testimony whereof I hereunto affix my signature.

IRWIN W. MILLER.